United States Patent [19]
Ensign et al.

[11] 4,108,418
[45] Aug. 22, 1978

[54] FLUID OPERATED PINCH VALVE

[75] Inventors: Harold W. Ensign, Fullerton; Clifford V. Zieg, Costa Mesa, both of Calif.

[73] Assignee: Cla-Val Co., Costa Mesa, Calif.

[21] Appl. No.: 760,816

[22] Filed: Jan. 19, 1977

[51] Int. Cl.² .............................................. F16K 7/07
[52] U.S. Cl. ........................................ 251/5; 137/375
[58] Field of Search ................................. 251/4–10; 137/375

[56] References Cited

U.S. PATENT DOCUMENTS

| 1,024,876 | 4/1912 | Barbour | 251/8 |
| 1,024,877 | 4/1912 | Barbour | 251/8 |
| 2,898,088 | 8/1959 | Alder | 251/5 |
| 2,972,464 | 2/1961 | Jones et al. | 251/5 |
| 2,995,335 | 8/1961 | Raftis | 251/5 |
| 3,285,563 | 11/1966 | Clarkson | 251/8 |
| 3,441,245 | 4/1969 | Holland et al. | 251/5 |
| 3,574,310 | 4/1971 | Souriau | 251/61.1 |

FOREIGN PATENT DOCUMENTS

| 504,449 | 8/1930 | Fed. Rep. of Germany | 251/8 |
| 957,412 | 5/1964 | United Kingdom | 251/8 |

Primary Examiner—Martin P. Schwadron
Assistant Examiner—Richard Gerard
Attorney, Agent, or Firm—Gausewitz, Carr & Rothenberg

[57] ABSTRACT

A fluid operated pinch valve comprises a flexible sleeve fixed at its ends within a valve casing that has a laterally facing opening through which the sleeve may be inserted and replaced without removing the valve casing from the flow line. A casing cover section has a planar sealing face that bridges the opening for sealing engagement with the main casing section, and which also seals against linear sealing flanges on ends of the flexible sleeve.

22 Claims, 5 Drawing Figures

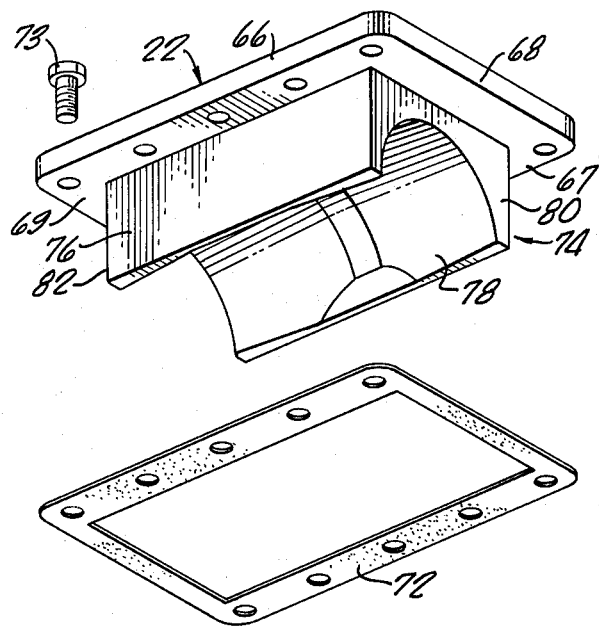
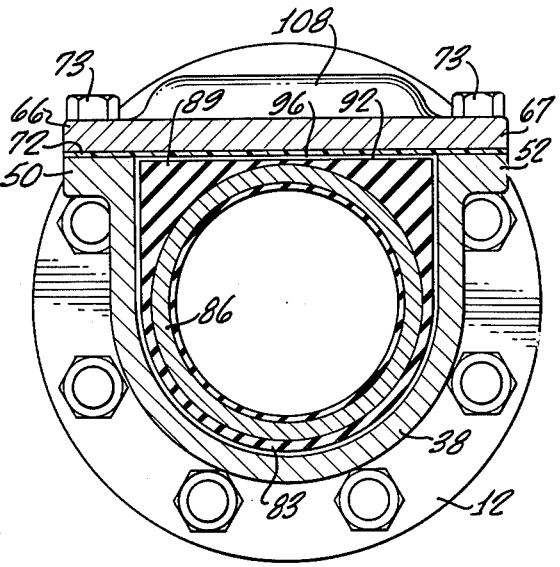
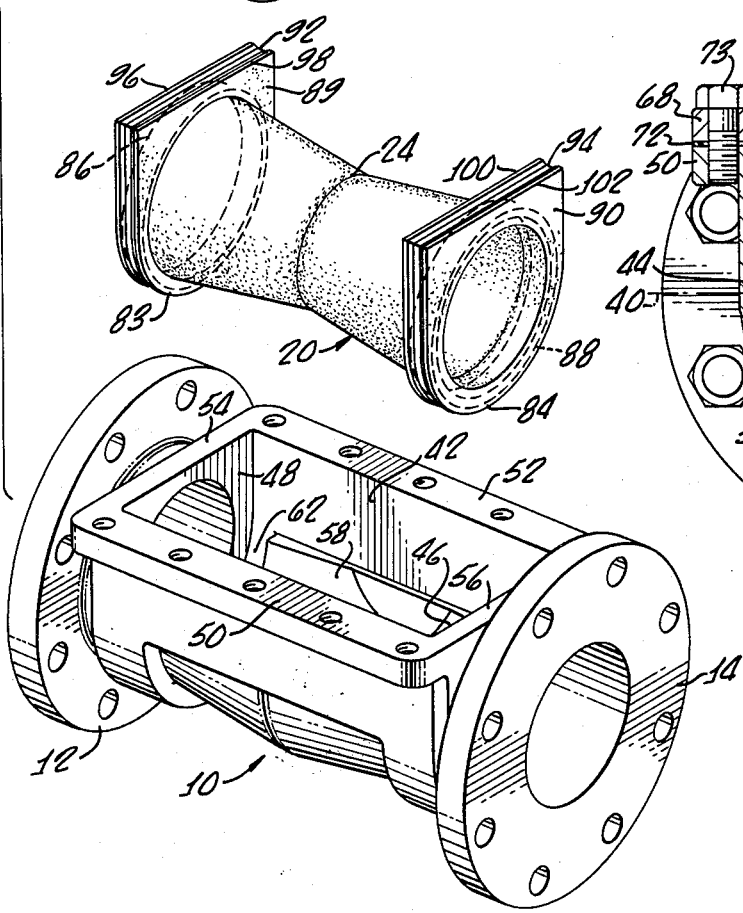
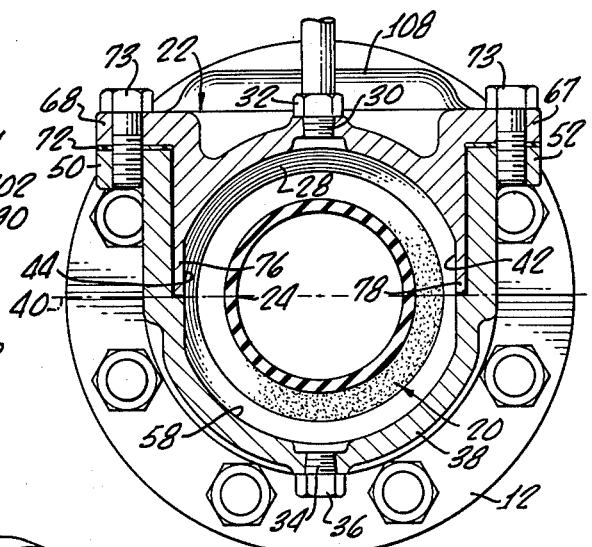
Fig. 3.
Fig. 4.
Fig. 5.

FLUID OPERATED PINCH VALVE

BACKGROUND OF THE INVENTION

This invention relates to pinch valves and more particularly concerns fluid operated pinch valves in which replacement of the flexible valve sleeve is facilitated without compromise of valve sealing.

Pinch valves or flexible sleeve valves have been employed for many years for their unique capability in handling of slurries, abrasive fluid media and other fluids that may contain solids. In general, such a pinch valve comprises a rigid casing that is fixed in a fluid flow line and contains a flexible sleeve. The sleeve is fixed to and sealed at its ends to the casing and means are provided to selectively compress the intermediate portion of the sleeve between its ends to such an extent that the central portion of the sleeve completely collapses with its interior surfaces in fluid-tight contact with each other to thereby block fluid flow. Such valves may be closed either partly or completely. They may properly close over solids entrained within the flowing fluid and seal fluid flow, leak-free, in spite of the presence of the solids.

For fluid actuation of the valve, a chamber is provided between the valve casing and an intermediate section of the flexible sleeve. Air or some other fluid under pressure is injected into the chamber to balance the internal flowing fluid pressure on the one hand when the valve is open, and to overcome such internal flowing fluid pressure to close the valve when fluid flow is to be prevented.

The nature of the pinch valve is such as to create large forces tending to move the sleeve longitudinally relative to its casing. Thus significant problems exist in properly retaining the flexible sleeve at its end portions while permitting adequate flexibility for closing. The pinch valve sleeve has been provided with an enlarged end flange which fits between the conventional end flange of the valve casing and the mating flange of the flow line to which the valve end flange is bolted. Such an arrangement is effective in both retaining the sleeve longitudinally and sealing the sleeve and casing in the flow line. However, such prior valves require that the entire valve be disconnected and removed from the flow line in order to install or remove the sleeve.

Particularly because of its common use with corrosive materials or abrasive slurries, the flexible sleeve is subject to wear and requires replacement from time to time. The requirement for complete removal of the valve in order to replace the sleeve is burdensome and time consuming and may limit locations and physical arrangements of the valve in a flow line.

In mechanically operated pinch valves sealing is important only between the flexible sleeve and the flow line. In fluid operated valves on the other hand, pressures of actuating fluid in the chambers between the sleeve and the valve casing must be considerably higher than pressure of the fluid flowing through the flow line and thus one must obtain satisfactory sealing of the sleeve to the flow line and to the casing about the fluid actuating portion of the valve. Prior arrangements have not provided adequately sealed fluid operated pinch valves in which the sleeve can be replaced without removing the valve body from the flow line.

Accordingly, it is an object of the present invention to provide a pinch valve that eliminates or minimizes above-mentioned problems.

SUMMARY OF THE INVENTION

In carrying out principles of the present invention in accordance with a preferred embodiment thereof, a tubular casing is provided with a flexible tubular sleeve radially spaced from the casing between casing end flanges. The casing is longitudinally divided for less than its full length to provide an opening that is spaced radially outwardly of the fluid flow axis by a distance at least equal to an exterior radial dimension of the sleeve. A second casing section is provided bridging the opening, to seal the casing sections to each other and to flanges on the sleeve.

BRIEF DESCRIPTION OF THE DRAWINGS

FIG. 3 is a section taken on line 3—3 of FIG. 1;

FIG. 4 is a section taken on line 4—4 of FIG. 1; and

FIG. 5 is an exploded perspective view of the valve.

DETAILED DESCRIPTION

Figure 1:
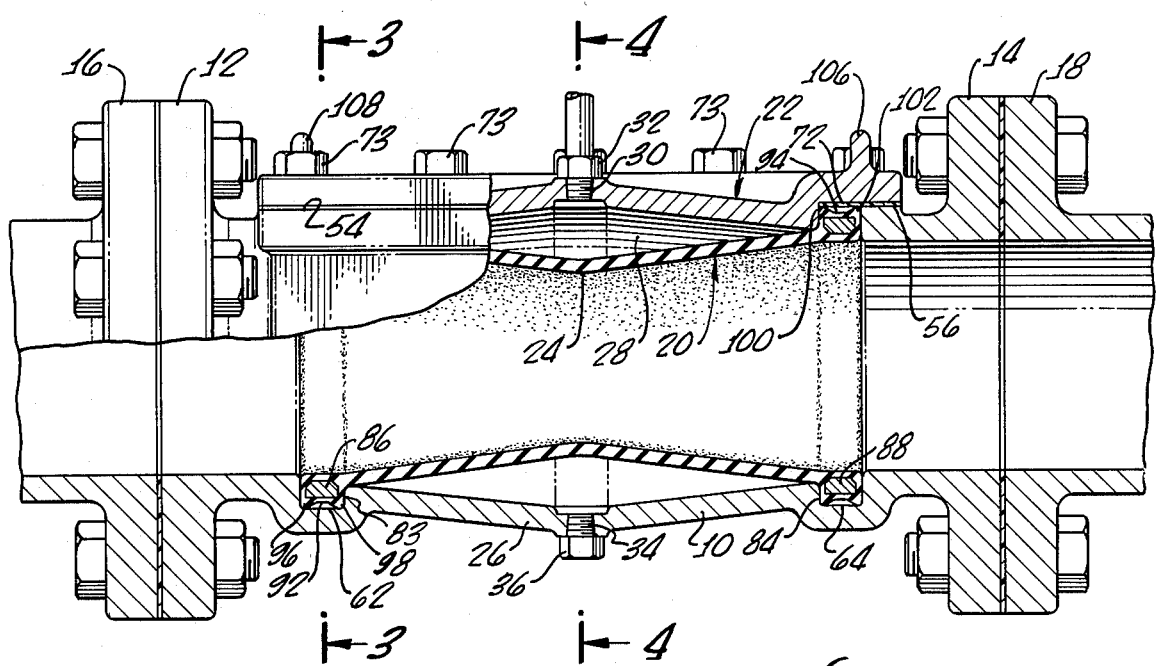
FIG. 1 is a side view, with parts broken away, of a portion of a flow line having inserted therein a valve embodying principles of the present invention.
Figure 2:
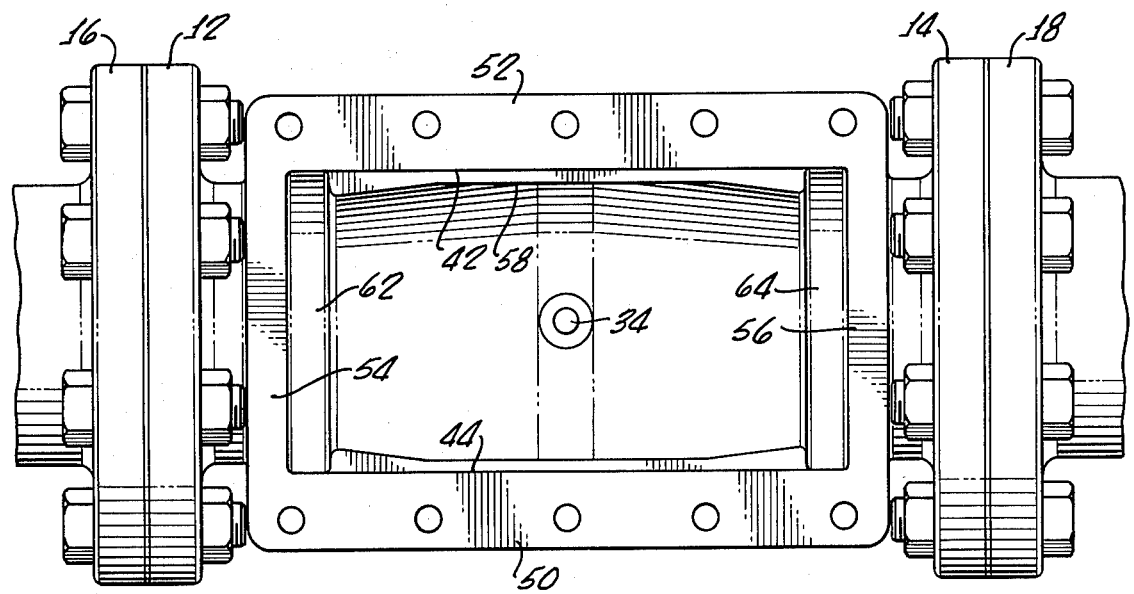
FIG. 2 is a top view of the valve of FIG. 1 with cover and sleeve removed.

As illustrated in FIG. 1, a valve embodying principles of the present invention includes a generally tubular casing having a first or main body section 10 integrally formed with circular connecting end flanges 12, 14 that are conventionally sealed and bolted to corresponding connecting end flanges 16, 18 of a conventional flow line through which flows a fluid that is to be selectively controlled by the valve. Mounted within the tubular casing 10 is a flexible tubular sleeve 20 that is retained within the main body section of the casing and sealed thereto by a second casing section or casing cover 22 that is bolted and sealed to the main casing section.

The sleeve is formed with an inwardly constricted intermediate portion 24 and the casing is formed with an outwardly bowed intermediate portion 26 which is thus radially spaced from the sleeve to provide an annular fluid actuating chamber 28. Air or other pressurized fluid is introduced into chamber 28 via a fitting 32 connected to a threaded aperture 30 formed in cover 22. A drain aperture 34 is also formed in the tubular casing and sealed with a removable plug 36.

The main casing or body section 10 has a cross-section, as seen in FIGS. 3 and 4, which has a portion 38 on one side of a diametral plane 40 that is of generally semi-cylindrical shape and coaxial with the flow passage of the vlave. This casing section includes sidewalls 42, 44 and end walls 46, 48 (see also FIG. 5) that extend from the cylindrical portion 38 on the other side of the diametral plane 40. The side and end walls define a rectangular planar opening that lies radially outwardly of the sleeve whereby the sleeve is fully contained within the primary casing section. Stated otherwise, the plane of the opening is spaced from the flow axis of the valve by a distance substantially equal to the radial extent of an exterior portion of the contained flexible sleeve. Although a planar opening is shown and presently preferred, the opening may be curved (or be in a curved plane), curving longitudinally, transversely or both, or may have some other configuration.

Sidewalls 42, 44 have their upper edges formed with laterally outwardly extending flanges 50, 52 which are coplanar with transverse end faces 54, 56 on the upper edges of end walls 46, 48. The end walls 46, 48 and end faces 54, 56 are longitudinally spaced apart by a distance less than the distance between the connecting flanges 12, 14 and define an opening having a length substantially equal to the length of the sleeve. The sleeve can be readily inserted into and removed from the valve through the opening which has a size equal to the maximum dimension of the sleeve. More specifically, an orthographic projection of the opening is congruent with a lateral orthographic projection of the sleeve so that the sleeve can be freely received into the valve body section and is a snug fit in the opening.

The main body section of the valve is formed with a longitudinally extending semi-cylindrical boss 58 (FIG. 5) that has a length less than the distance between the end walls 46, 48 of the main body section to cooperate with the end walls and define semi-circular grooves 62, 64.

The valve cover or second casing section 22 is a rigid member having a continuous peripheral planar sealing face, including longitudinally extending sections 66, 67 that abut casing section flanges 50, 52, and transversely extending sections 68, 69 that abut end faces 54, 56, with a sealing gasket 72 interposed therebetween. A plurality of bolts 73 rigidly but detachably secure the cover and press it in sealing engagement to the perimetral sealing surface circumscribing the opening of the main casing section 10. Thus the cover bridges the opening both longitudinally and transversely to provide a planar sealing surface that is parallel to the valve axis.

Integrally formed as a part of the cover is an inwardly (downwardly as viewed in FIGS. 3–5) projecting longitudinal positioning member 74 having sidewalls 76, 78 that are received between and closely adjoin the main casing section sidewalls 42, 44. Positioning member 74 also includes transverse ends 80, 82 that are juxtaposed to and spaced from the transverse internal end walls 46, 48 of the main casing section to define therewith recesses or grooves near the ends of the valve in registry with the semi-cylindrical recesses 62, 64 formed in the lower half of casing section 10.

The flexible sleeve is formed with laterally projecting end flanges in which are embedded annular stiffening rings 86, 88 formed of metal or other rigid material of equivalent strength and rigidity. The sleeve flanges have a semi-circular configuration at lower portions 83, 84 thereof for cooperation with the semi-circular grooves 62, 64 and have a generally rectangular configuration at upper portions 89, 90 thereof to mate with the generally rectangular end portions 46, 48 of the main casing section 10, both portions being pierced by the valve flow passage.

Rectangular sleeve flange portions 89, 90 have transversely extending linear upper edges 92, 94 which are contiguous to and coplanar with (when the sleeve is in the casing) the transverse end faces 54, 56 of the main casing section. The entire periphery of the sleeve flanges is provided with a pair of circumferentially extending axially spaced lips 96, 98, 100, 102 which significantly enhance the sealing of the sleeve flanges to the valve casing.

This duality of lips on each end, having a space between the lips of each pair, provides improved bi-directional sealing. With pressure exerted in one direction one lip (closer to the pressure source) may bend, but the second lip is pressed and sealed against the wall of its confining groove. With pressure exerted in the opposite direction the second lip may bend, but the one lip is pressed and sealed in the groove. This provides the sealing effect of a solid edge but adds the compressibility required to enable the sleeve flange to be forced tightly into the grooves as the cover 22 is pressed and bolted into place. As the cover forces the sleeve into position, either of the sealing lips may be distorted to expand into the space between the lips of a pair.

The outer diameter of the stiffener members 86, 88 is greater than the inner diameter of the grooves 62, 64, thereby to insure longitudinal positioning of the sleeve within the casing in the presence of great and repetitive longitudinal forces of the flow that is to be repetitively stopped by the valve sleeve.

The described construction provides a valve in which the flexible sleeve is readily replaceable without removing the valve from the line simply by removing the cover and then lifting out the valve sleeve. Further, the arrangement provides for optimum sealing of the valve sleeve to both sections of the casing, and sealing of the sleeve within the flow line. Improved sealing is also achieved by the particular arrangement of the valve cover and cooperating elements individually and collectively. The opening of the main body section of the casing is defined by a continuous perimetral sealing surface or flange, including elements 50, 52, 54 and 56. This continuous sealing surface (with the interposed gasket) is held firmly in sealing engagement with a similar continuous perimetral sealing surface 66, 67, 68, 69 formed on the underside of the cover 22.

The cover sealing surface 66–69 also seals against the transversely extending linear upper edges 92, 94 of the sleeve flanges. Thus the provision of a cover which bridges the casing section opening, extending longitudinally beyond the ends of the opening, effects a sealing of the two sections of the casing to each other and also effects a proper sealing of the sleeve to both of the casing sections.

It may be noted that the cover is bolted to the flanges 50, 52 only along lateral edges of the cover. However, transverse stiffening members 106, 108 are formed integrally with the cover and span from one flange to the other at longitudinally opposite end portions of the cover. This provides a firm sealing engagement and pressure of the cover ends upon both the main casing section and the valve sleeve flange ends.

The dimensions of the valve sleeve flanges, and more specifically the exterior portions of the sealing lips thereof, are such that these lips, as described above, are somewhat compressed when the sleeve is inserted into the main casing section and the cover is bolted into place. Thus, a tight reliable seal is provided between the sleeve flanges and the casing to contain the operating fluid within actuating chamber 28. The rectangular configuration of the upper portion of the sleeve flanges not only provides the transversely extending linear edges 92, 94 for improved sealing, but also provides a greatly enlarged area of flange that is retained within the recess defined by the end faces 80, 82 of the positioning member 76 of the cover and the end walls of the main casing section. The planar configuration of the critical sealing surface that is sealed by the gasket 72, between the cover and the main casing section and sleeve flanges, is preferred to curved sealing surfaces since the planar surfaces are easier to repair or resurface, and more readily inspected for proper configuration.

The positioning of the main section opening and the cover at a distance from the flow axis, and in a plane that is substantially tangent to a cylinder containing the semi-cylindrical portions 83, 84 of the sleeve sealing flanges, permits the sleeve to be inserted and fully seated before the cover is pressed in place. There is little or no danger of pinching the sleeve between two casing sections that are split along the diametral plane as in some of the prior art devices. Further, the valve body is stronger because its main (and integral) section 10 is more than just one-half of the flow line diameter.

For assembly, with the valve casing flanges 12 and 14 bolted and sealed to the flow line flanges 16 and 18, and with the cover 22 removed, the sleeve 20 is inserted into the main casing section with flange portions 83 and 84 of the sleeve received in the semi-circular grooves 62, 64. At this time the sealing lips of the upper linear edges 92, 94 of the sleeve flanges protrude slightly above the plane of the transverse sealing end faces 54, 56 of the main casing. However, the sleeve may be readily inspected visually to insure that it is properly positioned within the casing. The cover 22 is then positioned and its lateral flanges 66, 67 securely and firmly bolted to the lateral flanges 50, 52 of the main casing with the gasket 72 interposed. Pressing of the cover down upon the main casing flanges presses against the sleeve flanges and deforms the lips of the flanges to achieve a firm, tight seal. In effect, the continuous peripheral lips of the flanges are compressed between the circumscribing casing sections and the internal rigid rings 86, 88. To replace the sleeve, without disconnecting the valve from the flow line, the cover is removed, the sleeve is merely lifted out of the main casing and another sleeve inserted as described above.

In normal operation the valve sleeve provides a smooth and unobstructed passage for fluid flowing through the flow line. This passage may be partially or completely closed by introduction of pressurized air or other pressurized fluid into the chamber 28 through fitting 32. With a pressure in chamber 28 that is considerably higher than the flow line internal pressure, the intermediate section of the valve sleeve collapses to constrict or completely block the flow passage. Upon removal of the pressure in chamber 28, the sleeve returns to its normal configuration.

Preferably chamber 28 is pressurized during normal flow conditions of fluid flowing through the valve with a pressure approximately equal to the flow line pressure in order to minimize differential pressures on the sleeve 20. Thus the valve may be used with both high positive pressures and vacuum flow lines by balancing the internal pressure with the pressure in the actuating chamber. Plug 34 may be removed from time to time to provide drainage from the actuating chamber. If deemed necessary or desirable, valve flushing ports (not shown) may be provided in the main section of the valve casing between the flanges 12 and 14 and the ends of the cover. Such flushing ports which are normally sealed, may be employed to admit a fluid under pressure to the interior of the sleeve 20 for flushing of the valve and removal of particles, debris or other objects which may remain within the valve.

The valve body or casing may be made of conventional valve materials such as cast iron, aluminum, bronze, or various steels, among others. Sleeve material will depend upon the nature of the fluid media being handled and may include silicons, neoprenes, various types of rubbers and other suitable wear or corrosion resistant materials having adequate flexibility.

The foregoing detailed description is to be clearly understood as given by way of illustration and example only, the spirit and scope of this invention being limited solely by the appended claims.

What is claimed is:

1. A fluid operated pinch valve comprising
   a tubular casing having a flow axis and having connecting end flanges for connecting the casing in a flow line,
   a flexible tubular sleeve in said casing and having end sealing sleeve flanges, said casing and sleeve being radially spaced from each other between said end flanges to define an actuating chamber,
   said casing including means for admitting fluid under pressure to said chamber, said casing being longitudinally divided for less than its full length to provide a first casing section having an opening spaced radially outwardly of said flow axis by a distance at least equal to an exterior radial dimension of said sleeve, and
   a second casing section bridging and overlapping said opening both longitudinally and transversely (bridging said opening) to seal said casing sections to each other and to said sleeve flanges.

2. The valve of claim 1 wherein an orthographic projection of said opening is substantially congruent with a lateral orthographic projection of said sleeve, whereby said sleeve may be inserted into and removed from said casing through said opening.

3. The valve of claim 1 wherein said second casing section has a length greater than the length of said opening and includes a face overlying and sealed against said casing at ends of said opening.

4. The valve of claim 1 wherein said sleeve flanges each includes a rigid stiffening member affixed thereto and a plurality of axially spaced outwardly projecting lips.

5. (The valve of claim 4 wherein) A fluid operated pinch valve comprising
   a tubular casing having a flow axis and having connecting end flanges for connecting the casing in a flow line,
   a flexible tubular sleeve in said casing and having end sealing sleeve flanges, said casing and sleeve being radially spaced from each other between said end flanges to define an actuating chamber,
   said casing including means for admitting fluid under pressure to said chamber, said casing being longitudinally divided for less than its full length to provide a first casing section having an opening spaced radially outwardly of said flow axis by a distance at least equal to an exterior radial dimension of said sleeve,
   a second casing section longitudinally and transversely bridging said opening to seal said casing sections to each other and to said sleeve flanges,
   said second casing section having a length greater than the length of said opening and including a face overlying and sealed against said casing at ends of said opening, said sleeve flanges (include) including portions in sealing engagement with said second casing section face.

6. The valve of claim 5 wherein said casing has first and second axially spaced circumferentially extending internal recesses, and wherein each said sleeve flange includes a rigid flange stiffening member embedded therein, said sleeve flanges being received in said recesses, respectively.

7. A fluid operated pinch valve comprising a tubular casing having a flow axis and having connecting end flanges for connecting the casing in a flow line,
a flexible tubular sleeve in said casing and having end sealing sleeve flanges,
said casing and sleeve being radially spaced from each other between said end flanges to define an actuating chamber,
said casing including means for admitting fluid under pressure to said chamber,
said casing being longitudinally divided for less than its full length to provide a first casing section having an opening spaced radially outwardly of said flow axis by a distance at least equal to an exterior radial dimension of said sleeve,
a second casing section longitudinally and transversely bridging said opening to seal said casing sections to each other and to said sleeve flanges,
said first casing section (has) having an interior cross-section with a generally semi-circular portion on one side of a diametral plane and a non-circular portion on the other side of said diametral plane, said non-circular portion having a continuous perimetral sealing casing face defining said opening,
said second casing section having a continuous perimetral face in sealing engagement with said first casing section face and in sealing engagement with said sleeve flanges.

8. The valve of claim 7 wherein said first casing section face includes a transversely extending section and wherein at least one of said sleeve flanges includes an outward edge aligned with said transversely extending section of said first casing section face, said second casing section face being in sealing contact with both said outward edge and said first casing section face.

9. The valve of claim 8 including a sealing gasket bridging said outward edge of said sleeve flange and said first casing section face, said gasket being interposed between said last named edge and section face on its one side and said second casing section face on its other side.

10. The valve of claim 7 wherein said first casing section face includes a transverse section, and wherein each said sleeve flange includes a generally semi-circular portion on said one side of said diametral plane and a generally non-circular portion on the other side of said diametral plane, said sleeve flange non-circular portion having an outward edge aligned with said first casing section face, said second casing section face being in sealing contact with both said outward edge and said first casing section face transverse section.

11. The valve of claim 10 wherein said first casing section face lies in a plane contiguous to a plane containing said second casing section sealing face, and wherein said non-circular portions include linear edges coplanar with said first casing section face.

12. (The valve of claim 1 wherein) A fluid operated pinch valve comprising
a tubular casing having a flow axis and having connecting end flanges for connecting the casing in a flow line,
a flexible tubular sleeve in said casing and having end sealing sleeve flanges,
said casing and sleeve being radially spaced from each other between said end flanges to define an actuating chamber,
said casing including means for admitting fluid under pressure to said chamber,
said casing being longitudinally divided for less than its full length to provide a first casing section having an opening spaced radially outwardly of said flow axis by a distance at least equal to an exterior radial dimension of said sleeve,
a second casing section longitudinally and transversely bridging said opening to seal said casing sections to each other and to said sleeve flanges,
said first and second casing sections (have) having mutually cooperating and mating sealing surfaces lying in a common plane for sealing said sections to each other, said sleeve having sealing flanges in sealing engagement with the sealing surface of said second casing section.

13. A fluid operated pinch valve comprising
a tubular casing having a flow axis and having connecting end flanges for connecting the casing in a flow line,
a flexible tubular sleeve in said casing and having end sealing sleeve flanges, said casing and sleeve being radially spaced from each other between said end flanges to define an actuating chamber,
said casing including means for admitting fluid under pressure to said chamber,
said casing being longitudinally divided for less than its full length to provide a first casing section having an opening spaced radially outwardly of said flow axis by a distance at least equal to an exterior radial dimension of said sleeve,
a second casing section longitudinally and transversely bridging said opening to seal said casing sections to each other and to said sleeve flanges,
said first casing section (includes) including transverse internal end walls, and (wherein) said second casing section (includes) including an inwardly projecting longitudinal positioning member having transverse ends justaposed to and spaced from said end walls to define a recess extending about said casing, said sleeve flanges being received in said recess.

14. The valve of claim 13 wherein said second casing section has transversely extending, inwardly facing sealing faces projecting longitudinally of said positioning member and overlying portions of both said sleeve flanges and said first casing section.

15. A fluid operated pinch valve comprising
a tubular casing having a flow axis and having connecting end flanges for connecting the casing in a flow line,
a flexible tubular sleeve in said casing and having end sealing sleeve flanges, said casing and sleeve being radially spaced from each other between said end flanges to define an actuating chamber,
said casing including means for admitting fluid under pressure to said chamber,
said casing being longitudinally divided for less than its full length to provide a first casing section having an opening spaced radially outwardly of said flow axis by a distance at least equal to an exterior radial dimension of said sleeve,
a second casing section longitudinally and transversely bridging said opening to seal said casing sections to each other and to said sleeve flanges,
said first casing section (includes) including transverse internal end walls and longitudinal internal side walls having a continuous perimetral casing sealing face defining said opening, said second casing section including a continuous perimetral face having transverse and longitudinal sections in sealing engagement with said first casing section sealing face to provide a complete perimetral seal of said opening.

16. The valve of claim 15 wherein said second casing section includes an inwardly projecting longitudinal positioning member having transverse ends juxtaposed to and spaced from said transverse internal end walls, said sleeve flanges extending between said transverse internal end walls and said positioning member and each having an edge aligned with said first casing section sealing flange, said transverse section of said second casing section sealing face being sealed against said sleeve flange edges.

17. A fluid operated pinch valve comprising
a valve casing defining a flow passage having a flow axis, said casing including
connecting end flanges for connecting the valve in a flow line,
a first body section between said end flanges having a portion on one side of a diametral body plane, said portion being of generally semi-cylindrical shape coaxial with the flow passage of said valve, said body section having side and end walls extending from said cylindrical portion on the other side of said diametral plane and defining an opening spaced from said flow axis by a distance of about the radius of said casing body section, semi-circular grooves formed in an inner surface of said body section axially inwardly of said end flanges,
a flexible tubular sleeve in said casing having an intermediate portion spaced from said valve casing and having sleeve sealing flanges with semi-circular portions received in said grooves, and
a casing cover having a continuous sealing face mounted in sealing engagement with said side and end walls.

18. The valve of claim 17 wherein said sleeve and said opening each have a length less than the distance between said connecting end flanges.

19. The valve of claim 17 wherein each said sleeve flange has a portion thereof in sealing engagement with said cover sealing face.

20. The valve of claim 17 wherein said opening lies in a plane parallel to said flow axis, and wherein said body section end walls have a generally rectangular perimeter pierced by said flow passage within said casing on said other side of said diametral plane, said sleeve flanges having a rectangular perimeter pierced by said flow passage on said other side of said diametral plane, said sleeve flange perimeters including linear edges coplanar with and contiguous to said end walls in the plane of said opening.

21. The valve of claim 20 wherein said side and end walls include a continuous planar casing sealing flange defining and lying in the plane of said opening, said sleeve flange linear edges being coplanar with said casing flange, said cover sealing face being planar and bridging said sleeve flange linear edges and said casing flange at said end walls.

22. The valve of claim 20 wherein said casing cover includes a positioning member extending radially inwardly of said sealing face toward said first body section, said positioning member having end faces cooperating with said body section end walls to define axially spaced grooves, said sleeve flanges being received in said grooves.

* * * * *